Sept. 7, 1954     F. FAHRNI     2,688,306
APPARATUS FOR FORMING AN ADHESIVE FILM
Filed Jan. 11, 1951     4 Sheets-Sheet 1

INVENTOR.
FRED FAHRNI
BY

INVENTOR.
FRED FAHRNI

Sept. 7, 1954 F. FAHRNI 2,688,306
APPARATUS FOR FORMING AN ADHESIVE FILM
Filed Jan. 11, 1951 4 Sheets-Sheet 3
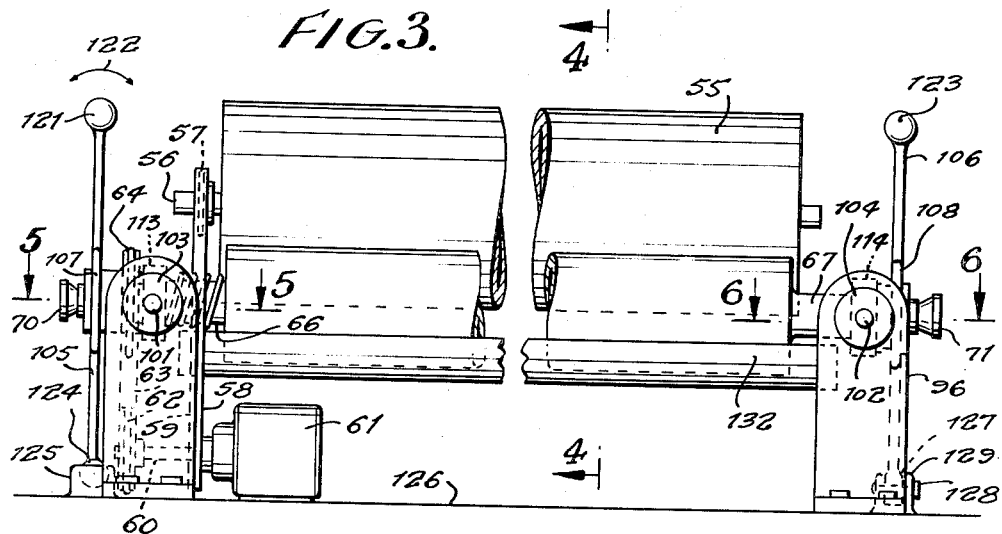
FIG. 3.
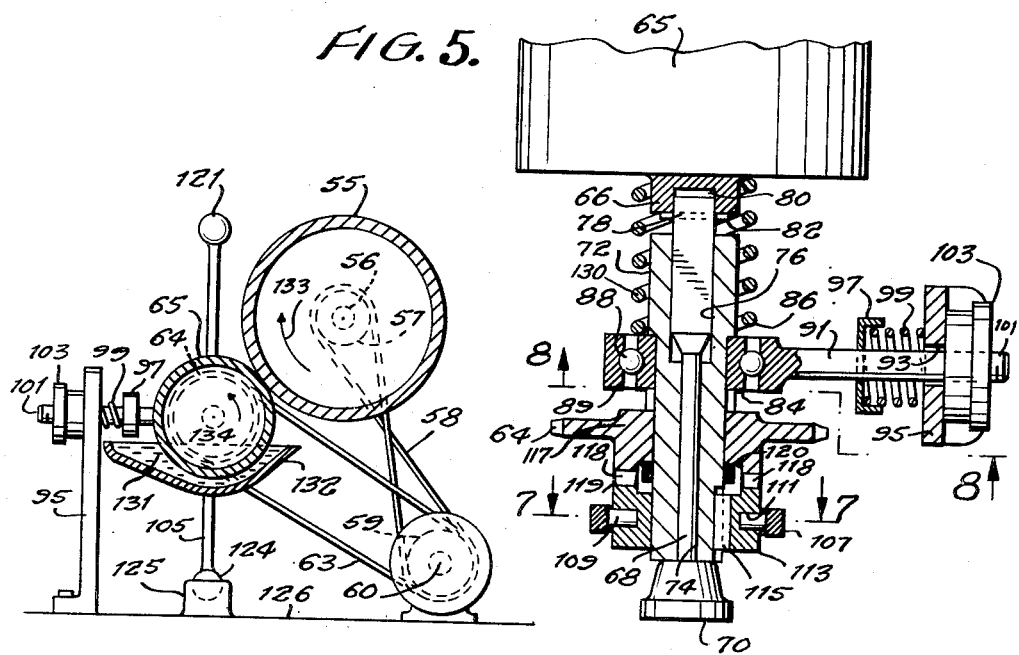
FIG. 5.
FIG. 4
INVENTOR.
FRED FAHRNI
BY Sept. 7, 1954 F. FAHRNI 2,688,306
APPARATUS FOR FORMING AN ADHESIVE FILM
Filed Jan. 11, 1951 4 Sheets-Sheet 4

INVENTOR.
FRED FAHRNI
BY

Patented Sept. 7, 1954

2,688,306

UNITED STATES PATENT OFFICE 2,688,306

APPARATUS FOR FORMING AN ADHESIVE FILM

Fred Fahrni, Zurich, Switzerland

Application January 11, 1951, Serial No. 205,950

10 Claims. (Cl. 118—262)

The present invention relates to an apparatus for applying adhesive to a mass of chips, which may include shavings and other discrete particles of wood or other similar material, for the manufacture of pressed articles. This application is a continuation-in-part of my co-pending application Serial No. 1,361, filed January 9, 1948, for Adhesive Applying Apparatus, which has matured into Patent No. 2,542,804, and of application Serial No. 617,881, filed September 21, 1945, and now abandoned.

In the manufacture of artificial boards or other shaped articles made of wood particles of miscellaneous shapes bonded together, the uniform mixture of the adhesive with the wood particles improves the quality of the product. A novel and most effective apparatus for achieving the aforesaid desired mixture of the adhesive with the wood particles is fully described and claimed in the U. S. Patent No. 2,542,804 referred to above. Such apparatus, as shown in detail in said patent and as indicated herein later on, includes adhesive-transfer rolls or drums for transferring the glue from a source such as a trough to a gluing roll with which the wood particles to be glue-coated are brought into contact.

It is a primary object of the present invention to include means for assembling and releasing such an adhesive-transfer roll or drum in the aforesaid apparatus, or in other similar apparatus as will appear herein, to provide for cleaning and replacing the roll when required.

An ancillary object of the invention is to include in the construction of the apparatus resilient spring-biased means for normally urging the adhesive-transfer roll toward an adhesive-applying drum serving to apply the adhesive to the material under treatment.

The invention provides in a practical embodiment a hopper and an adhesive-applying roll or drum or even a plurality of such drums, to which adhesive is applied in a thin film and from which it is taken up by the chips or other similar material which is alternately tumbled in the hopper and pressed into firm contact with the adhesive. As disclosed in said Patent No. 2,542,804, for the purpose of tumbling and mixing the material as well as pressing it into contact with the adhesive-applying drum a plurality of fluted rolls are arranged in the hopper and means is provided for driving alternate rolls in opposite directions within the mass of chips in the hopper in position to tumble the chips and to press a portion of the chips against the adhesive-applying drums.

The present adhesive applying machine comprises the combination of a rotatable adhesive-applying drum for applying the adhesive directly to the chips, an adhesive-transfer roll adapted to rotate against the adhesive-applying drum to transfer adhesive thereto, means for simultaneously driving the drum and the roll in the same direction in order to produce a wiping action therebetween, an adhesive-trough disposed beneath the adhesive-transfer roll for constantly supplying the latter with adhesive, a pair of movably adjustable bearings rotatably supporting the adhesive-transfer roll, means for supporting the adjustable bearings, a pair of upwardly extending swingable posts or bars individually connected to the adjustable bearings and having manual means for swinging them in predetermined limited manner and thereby adjustably moving the adjustable bearings, and pivot mountings at the lower ends of both of the swingable posts disposed in effective positions to allow at least a swinging movement of the swingable posts in two opposite directions in order to bring the adhesive-transfer roll toward and away from the adhesive-applying drum.

Various objects, advantages and features of the invention will be better understood from consideration of a description of particular apparatus suitable for practising and embodying the principles of the invention. For the purposes of such description reference should be had to the accompanying drawings forming a part hereof and in which:

Fig. 3 is a front elevation of a simplified form or modification of the machine or apparatus of Figs. 1 and 2, and including special supports for the adhesive-transfer roll, as well as certain adjustments therefor;

Fig. 4 is a vertical section of the apparatus of Fig. 3 as taken on line 10—10;

Fig. 5 is a fragmentary longitudinal section of detail of the apparatus as taken on line 11—11 in Fig. 3;

Throughout the views, the same reference numerals indicate the same or like parts.

Figure 1:
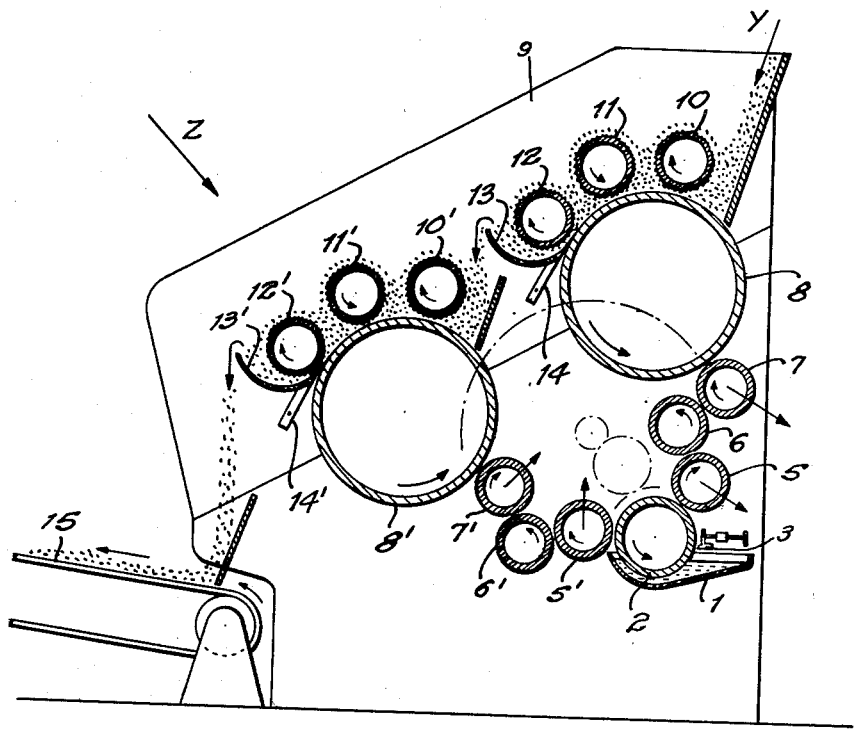
Fig. 1 is a diagrammatic cross-section of a machine embodying the invention illustrating the location and operation of the different cylinders or rolls.
Figure 2:
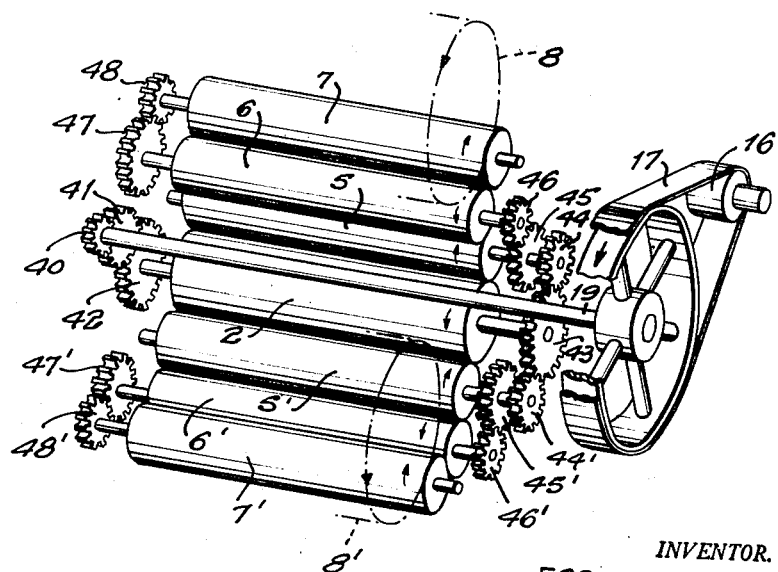
Fig. 2 shows an arrangement and drive of the glue transfer rolls.
Figure 6:
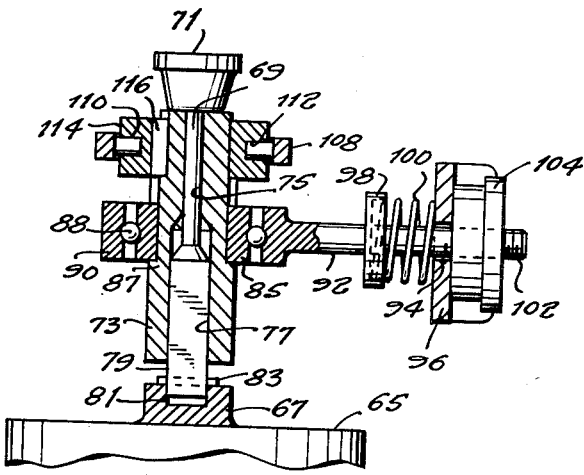
Fig. 6 is a plan view of the apparatus of Figs. 3 and 4, omitting the supports and drive for clarity of illustration.
Figure 7:
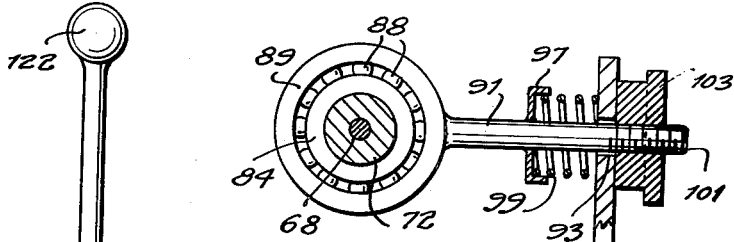
Fig. 7 is a fragmentary section, partly similar to Fig. 4, but taken on line 13—13 in Fig. 5 and illustrating an adjustable gauging or measuring means for the glue-transfer roll operating in the glue trough or tray of the apparatus.
Figure 8:
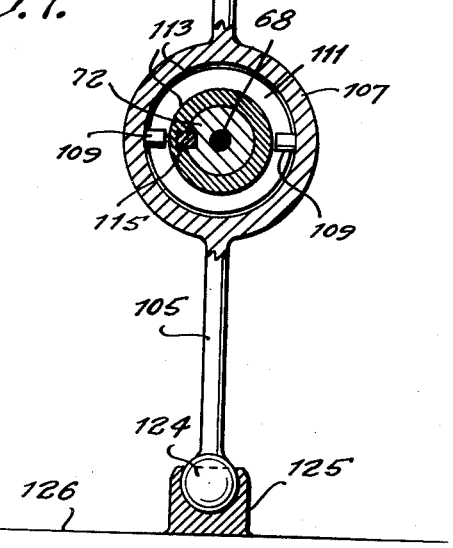
Fig. 8 is a fragmentary section of other details of the apparatus as taken on line 14—14 in Fig. 5.

In the apparatus particularly illustrated in Figs. 1 and 2, adhesive is applied to a thin film to a plurality of similar rolls or drums. In the remaining views a simple form is shown wherein adhesive is applied to a single roll. A hopper is arranged over the adhesive-applying drums and fits over the drums in a manner to contain a considerable mass of chips which may be shavings and discrete particles of miscellaneous sizes and shapes but all of relatively small size for convenient handling in the machine. The term "chips" is used in its broad sense to define a variety of material and not in a restrictive sense.

By maintaining a thin film of liquid adhesive on the one or two drums used, and by agitating the mass of material and bringing various portions thereof repeatedly into contact with the drums, the adhesive is well distributed throughout the mass.

A supply of liquid glue or other adhesive is maintained in a tank 1 in which roll 2 is partly immersed and rotates in the direction of the arrow. A scraper 3 (Fig. 1) that may be adjusted through a threaded control without any clearance serves for measuring the amount of glue required for the feeding of the following series of glue-transfer rolls.

The transfer of the glue over the rolls 5, 6, 7 on one hand and 5', 6', and 7' on the other, serves to apply a thin film of glue to the two large gluing rolls 8 and 8'. It should be remarked that the intermediate transfer rolls 5, 6 and 7 and 5', 6' and 7' are separated from one another by gaps that become narrower in the mentioned order of succession of the rolls in each series while the peripheral speed of said rolls increases in accordance with the same order of succession.

A closed container 9 (Fig. 1) provides for continuous introduction of wood particles from above in the direction of the arrow Y so as to drop on to the rotary gluing roll 8. Above each of said gluing rolls 8 and 8' and relatively close thereto are provided three corrugated cylinders lying one behind another, said corrugated rolls or cylinders shown, respectively, at 10, 11 and 12 and at 10', 11' and 12', providing for the continuous tumbling of the wood chips and intimate contacting thereof with the gluing rolls. The first corrugated roll or cylinder 10 takes hold of the wood particles with a greater peripheral speed than that of the roll 8 and carries said particles along in the same direction of rotation through the gap of adjusted breadth between the rolls 8 and 10 so as to make them pass in wiping contact with the glue film adhering to the roll 8. The second corrugated roll or cylinder 11 assuming an opposite direction of rotation and lying also at a suitable distance from the roll 8 shows a higher peripheral speed than the first corrugated roll or cylinder 10. Said roll rotating in the opposite direction takes hold of the particles fed by the first corrugated roll and provides for their tumbling and stirring with one another while furthermore the particles that have already received a glue coating rub against those that are not yet entirely coated so as to provide all of the particles with a uniform coat of glue through the mutual action of the rolls and particles. The corrugated roll 11 also engages masses of chips and carries them in the direction of its rotation between itself and the smoother glue-applying roll 8. The chips by this action are moved along in a direction opposite to the direction of peripheral movement of the glue-applying roll, wiping against the roll to pick up glue. The third corrugated roll 12 rotates again to move its periphery in the same direction as that of the gluing roll 8 and lies also at an adjusted distance from the latter and rotates at a still greater peripheral speed than the corrugated roll 11; said roll 12 engages the particles again and urges them in a direction such that they move away from the following particles over the baffle plate 13 of metal sheet and fall on to the second gluing roll 8' with reference to which the whole operation begins over.

In order that the gluing rolls 8, 8' may retain a clean peripheral surface beyond the baffle plates 13, 13' there is associated with each baffle a scraper 14, 14' (Figs. 1 and 2), that serves for removing any particles and glue residuum that may possibly adhere thereto. Such residual glue is continuously removed by the wood particles wiping over the scrapers under the action of the last corrugated roll 12.

As the gluing is entirely carried out over the two rolls 8 and 8' and this leads to a thorough coating of the particles with glue, the machine described may be termed a twin machine.

After the particles have left the machine, having passed over the second sheet metal baffle plate 13', they drop on to a belt conveyor 15 lying underneath same and are fed by this to the means used for further operation, that is, for moulding and compression.

The mechanical part of the machine thus far disclosed will now be described in further detail:

Fig. 2 illustrates the driving means for the glue-transfer rolls 5, 6, 7 and 5', 6' and 7', as provided through a main control shaft 19 carrying the belt controlled pulley 18. To the other end of the shaft 19 is keyed a pinion 40 controlling through an intermediary pinion 41 the gear wheel 42 carried by the shaft of the immersed roll 2 for controlling same. Said shaft of the immersed roll 2 carries at its opposite end a pinion 43 that is keyed thereto and that controls the two adjacent glue-transfer rolls 5 and 5' through the corresponding gear wheels 44 and 44', rigid therewith. The gear system thus described provides a higher peripheral speed for the glue-transfer rolls 5 and 5' than for the roll 2. This difference in peripheral speed results in furthering the spreading and drawing of the glue film.

The glue-transfer rolls 5 and 5' carry each a further gear wheel 45 and 45', respectively, engaging the corresponding gear wheels 46 and 46' whereby they provide for the drive of the adjacent glue-transfer rolls 6 and 6' also at a higher peripheral speed than the rolls 5 and 5'.

The gear wheels 47 and 47' rigid with the opposite ends of the shafts of the glue-transfer rolls 6 and 6' control through the gear wheels 48 and 48' the glue-transfer roll 7—7' that are again caused to rotate at a higher peripheral speed than the rolls 6 and 6'. Thus the peripheral speed increases continuously from one roll to the next in the order of rolls 2, 5, 6, 7 and 8 or 2, 5', 6', 7' and 8'.

While it has been shown that several rolls or drums may be used to apply the required adhesive to chips and particles of wood or other material which is to be compressed into panels, slabs, sheets or blocks etc., yet it is evident that in a simple form of the apparatus appearing in Figs. 3 to 8, a single drum or adhesive-applying roll may be employed in association with a glue-transfer roll normally held resiliently against the drum and mounted for ready disengagement from the drum, and in fact, for complete removal or replacement, if so desired.

Thus, an adhesive-applying drum or roll 55 serving to apply glue to the material to be treated, corresponds to rolls 8 already referred to and is mounted on a shaft 56 extending therethrough and rotatably supported in bearings (not shown for the sake of clarifying and simplifying the drawing). A chain sprocket 57 is preferably fixed on one end of the shaft and connected by a drive chain 58 to a driving chain sprocket 59 on the drive shaft 60 of a prime mover 61, so that the roll is driven in direction of arrow 133. Of course, a pair of aligned trunnions could instead be fixed on the ends of roll 55 and the drum left hollow within the ends, but such construction is optional. On drive shaft 60 is fixed a second driving chain sprocket 62 connected by a second drive chain 63 to a further sprocket 64 serving to drive a second roll 65 in direction of arrow 134; this roll 65 is mounted in a special manner as will now be detailed.

Upon the ends of roll 65 are fixed a pair of hollow hubs 66, 67 forming sockets into which a pair of independently removable pins 68, 69 project slidably (Figs. 5 and 6), being provided with external heads or knobs 70, 71 by which to manipulate them, as will be further explained. These pins extend slidably through a pair of end sleeves 72, 73 having axial holes 74, 75 of a relatively small diameter extending axially part of the distance through the sleeves. Toward the inner ends of the latter, the holes are enlarged to form substantially square holes 76, 77 through which the enlarged inner square ends 78, 79 of pins 68, 69 extend toward roll 65, and normally engage in the square holes or sockets 80, 81 in hubs 66, 67, the square holes 76, 77 in the sleeves being sufficiently deep in the intermediate portions of the sleeves to allow withdrawal of the square ends 78, 79 of the supporting pins sufficiently into the same in order to remove them from the sockets of the end hubs 66, 67 of drum or roll 65.

The mentioned sleeves are externally provided with ball races 84, 85 fixed thereon against shoulders 86 and 87, while ball bearings 88 between said inner ball races and outer ball races 89, 90 serve to mount the sleeves in rotatable manner. The outer ball races are provided with integral shanks 91, 92 extending horizontally through apertures 93, 94 in a pair of upright posts 95, 96 fixed in position beyond both ends of roll 65 at the front side thereof and serving to adjustably locate the ball bearings and the sleeves rotatable therein and thereby the roll 65 by means of the slidable pins borne by said sleeves. On shanks 91, 92 are fixed a pair of cups or concave washers 97, 98 serving as stops for springs 99 and 100 bearing against posts 95, 96 and resiliently biasing the shanks 91, 92 and thereby the ball bearings and roll 65 toward drum or roll 55. The outer ends 101, 102 are threaded and carry adjusting nuts 103, 104 bearing against the outer sides of posts 95, 96 for adjusting the roll 65 with respect to drum or roll 55. The springs bearing against the cups on the shanks exert resilient pressure on roll 65 to hold it against the larger roll or drum 55, and the degree of pressure can be nicely adjusted.

For supporting the sleeves, and thereby the slidable pins as well as roll 65, a pair of upright manually swingable posts or bars 105 and 106 are provided intermediate their height with shifting rings 107, 108 having pairs of horizontally aligned shifting fingers 109, 110 extending into grooves 111, 112 in a pair of shifting collars 113, 114. These collars are splined on sleeves 72, 73 by means of keys 115, 116 in such fashion as to allow limited axial sliding movement of at least collar 113 on the outer end of sleeve 72, while ensuring positive rotation of both sleeves with their respective collars. Collar 114 is fixed in position, as axial movement thereof is not necessary for the present purpose.

On the mutually facing ends or sides of collar 113 and hub 117 on sprocket 64 are fixed interengageable clutch teeth 118, 119, the sprocket being normally freely rotatable on the sleeve and prevented from displaying axial shift by a small collar 120 fixed on the sleeve to confine the sprocket. When the prime mover is caused to operate, chain 63 will constantly rotate sprocket 64, and in order to control transfer of motion from the sprocket to roll 65, swingable post or bar 105 is provided at the upper end with a knob 121 whereby to manually shift it and thereby shift collar 113 axially into engagement with the sprocket by means of clutch teeth 118, 119, or to separate these teeth in order to selectively drive or stop rotation of roll 65, the knob being shifted in either direction as indicated by arrow 122 in Fig. 3. The other swingable post or bar 106 is similarly provided with a knob 123 by which to manipulate it for another purpose about to be explained.

In order to facilitate the mentioned movement of swingable post or bar 105 and also allow further movement substantially transverse to this mentioned movement, the lower end of the post is provided with a ball 124 mounted in a ball socket 125 fixed in position on the floor 126 or other support upon which the machine is mounted. As the ball and socket joint thus provided is a form of universal joint, it will allow tilting of swingable post or bar 105 in substantially any direction, and certainly toward and away from the axis of rotation of main drum 55 in order to temporarily shift the smaller roll 65 away from drum 55 for adjustment, replacement or cleaning. In partly corresponding manner, the lower end of the other swingable post or bar 106 is formed into a transversely bored hub 127 pivotally supported on a horizontal pivot pin 128 mounted in a fixed bearing 129 in parallelism with the axis of drum 55. Both swingable posts or bars are thus capable of being tilted or swung away from or toward the axis of this drum, and thereby the roll 65 is shiftable at will toward and away from the drum against springs 99, 100 on shanks 91, 92 of bearing 89, 90. The second post or bar 106 is strictly limited to such movement in a single plane, due to its pivotal mounting on pin 128, so that this post tends to prevent longitudinal shifting of roll 65. This roll is resiliently biased toward post or bar 106 by a spring 130 mounted on sleeve 72 and hub 66 and acting against bearing 84 on this sleeve at the other end of roll 65.

Assuming that shaft 56 of drum 55 is supported in substantially fixed bearings (not shown), the arrangement is such that the swinging post 105 at the left in Fig. 3 is swingable outwardly toward the left away from the end of roll 65, thereby shifting clutch collar 113 outwardly along sleeve 72 so as to disengage clutch teeth 119 thereof from the corresponding teeth 118 of sprocket 64, allowing the latter to continue rotating while the collar and sleeve as well as roll 65 cease rotating, if the motor 61 is in actual operation. Whether or not this is the case, the smaller roll may be shifted away from drum 55 as already intimated, and the latter released for removal or replacement by drawing knobs or heads 70 and 71 outwardly in opposite directions. As the square holes 76 and 77 in sleeves 72 and 73 extend sufficient distances into the sleeves to provide internal clearances allowing withdrawal of the enlarged square inner ends 78 and 79 from said sleeves from the hub sockets 80, 81 on roll 65, this roll will be free to be lifted out of the machine, spring 130 then resting on sleeve 72.

On the other hand, insertion of roll 65 is readily performed by placing it with its hubs 66 and 67 aligned with sleeves 72 and 73, hub 66 being located within spring 130, and pushing in knobs 70 and 71 while manually slightly rotating the knobs until the square inner ends 78 and 79 of pins 68 and 69 register with the square socket holes 80 and 81 in roll hubs 66 and 67, when these square ends 78 and 79 are easily pushed into the socket holes and the roll is then in operative position as soon as the swingable posts 105 and 106 are also allowed to resume their upright positions due to the action of springs 99 and 109.

The function of roll 65 is to transfer a film of glue or other adhesive to the drum 55 which comes into contact with chips or particles of wood or other material as in the case of drums 8 in Figs. 1 and 2. Roll 65, in similar fashion as roll 2 in Fig. 1, for example, dips into a bath 131 of fluid glue in a glue tray or trough 132 (Fig. 4, corresponding to tray or trough 2 of said Fig. 1) which trough may be attached to post 95 if desired, or otherwise supported in effective position to subject the roll to continuous contact during rotation with the fluid glue 131 in this trough.

Inasmuch as the drums or rolls 55 and 65 are driven in opposite directions through chains 58 and 63 from sprockets 59 and 62 on shaft 60 of motor 61, the mutually contacting surfaces of both rolls will pass each other in the same direction and thereby produce a squeezing action which transfers the glue film upon roll 65 freshly raised from bath 131 to roll or drum 55. Of course, in actual operation, upper rolls not appearing in Figs. 3 to 8, but similar to material treating rolls 10, 11 and 12 of Figs. 1 and 2 are preferably located adjacent to drum 55 to cooperate therewith for the purpose of applying the fluid adhesive transferred thereto from roll 65 to the mentioned material. The upper rolls are omitted to simplify the views but should be understood as included in the scope of the invention when referring to the mentioned Figs. 3 to 8.

Manifestly, variations may be resorted to and parts and features may be modified or used without others or even replaced by others within the scope of the appended claims.

Having now fully described my invention, I claim:

1. In a machine for applying adhesive to chips or the like, the combination of a rotatable adhesive-applying drum for applying the adhesive directly to the chips; an adhesive-transfer roll adapted to rotate against the adhesive-applying drum to transfer adhesive thereto; means for simultaneously driving the drum and the roll in opposite directions in order to produce a squeezing action therebetween; an adhesive-trough disposed beneath the adhesive-transfer roll for constantly supplying the latter with adhesive; a pair of bearings rotatably supporting said adhesive-transfer roll; mounting means for movably supporting said bearings; a pair of upwardly extending swingable posts individually connected to said bearings and having manual means for swinging them and thereby moving said bearings; and pivot mountings at the lower ends of both of said swingable posts disposed in effective positions to allow a swinging movement of said swingable posts in two opposite directions in order to bring said adhesive-transfer roll toward and away from said adhesive-applying drum.

2. In a machine for applying adhesive to chips or the like, the combination of a rotatable adhesive-applying drum for applying the adhesive directly to the chips; an adhesive-transfer roll adapted to rotate against the adhesive-applying drum to transfer adhesive thereto; means for simultaneously driving the drum and the roll in opposite directions in order to produce a squeezing action therebetween; an adhesive-trough disposed beneath the adhesive-transfer roll for constantly supplying the latter with adhesive; a pair of bearings rotatably supporting said adhesive-transfer roll; a pair of upwardly extending fixed posts for supporting said bearings; connecting means engaging with said fixed posts and being connected to said bearings; resilient means disposed intermediate said fixed posts and said bearings and biasing the latter and thereby said adhesive-transfer roll toward said adhesive-applying drum; a pair of upwardly extending swingable posts individually connected to said bearings and having manual means for swinging them and thereby moving said bearings; and pivot mountings at the lower ends of both of said swingable posts disposed in effective positions to allow a swinging movement of said swingable posts in two opposite directions in order to bring said adhesive-transfer roll toward and away from said adhesive-applying drum.

3. In a machine for applying adhesive to chips or the like, the combination of a rotatable adhesive-applying drum for applying the adhesive directly to the chips; an adhesive-transfer roll adapted to rotate against the adhesive-applying drum to transfer adhesive thereto; means for simultaneously driving the drum and the roll in opposite directions in order to produce a squeezing action therebetween; an adhesive trough disposed beneath the adhesive-transfer roll for constantly supplying the latter with adhesive; a pair of bearings rotatably supporting said adhesive-transfer roll; a pair of upwardly extending fixed posts spaced apart from each other; extensions upon said bearings adjustably mounted on the fixed posts whereby to support said bearings; springs mounted on said extensions intermediate said fixed posts and said bearings for biasing the latter and thereby said adhesive-transfer roll toward said adhesive-applying drum; a pair of upwardly extending swingable posts individually connected to said bearings and having manual means for swinging them and thereby moving said bearings; and pivot mountings at the lower ends of both of said swingable posts disposed in effective positions to allow a swinging movement of said swingable posts in two opposite directions in order to bring said adhesive-transfer roll toward and away from said adhesive-applying drum.

4. In a machine for applying adhesive to chips or the like, the combination of a rotatable adhesive-applying drum for applying the adhesive directly to the chips; an adhesive-transfer roll adapted to rotate against the adhesive-applying drum to transfer adhesive thereto; means for simultaneously driving the drum and the roll in opposite directions in order to produce a squeezing action therebetween; an adhesive-trough disposed beneath the adhesive-transfer roll for constantly supplying the latter with adhesive; a pair of bearings; central sockets on the ends of the adhesive-transfer roll; elongated axially movable centering means supported in said bearings and adapted to extend non-rotatably into said sockets and capable of being withdrawn therefrom to liberate said adhesive-transfer roll; a pair of upwardly extending fixed posts spaced apart for supporting said bearings; connecting means movably mounted on the fixed posts and being connected to said bearings; resilient means disposed intermediate said fixed posts and said bearings biasing the latter and thereby said adhesive-transfer roll toward said adhesive-applying drum; and a pair of upwardly extending swingable posts individually connected to said bearings and having manual means for swinging them and thereby moving said bearings.

5. In a machine for applying adhesive to chips or the like, the combination of a rotatable adhesive-applying drum for applying the adhesive directly to the chips; an adhesive-transfer roll adapted to rotate against the adhesive-applying drum to transfer adhesive thereto; drive means for simultaneously driving the drum and the roll in opposite directions in order to produce a squeezing action therebetween, said drive means comprising a drive member; an adhesive-trough disposed beneath the adhesive-transfer roll for constantly supplying the latter with adhesive; central sockets upon the ends of the adhesive-transfer roll; a pair of sleeves respectively located opposite said sockets, one of said sleeves supporting said drive member for free rotation; a pair of axially shiftable non-rotatable pins extending through the sleeves and adapted to project non-rotatably into the sockets of said adhesive-transfer roll; a clutch collar mounted on said one sleeve only for sliding movement therealong so as to be removably engageable with said drive member; an upwardly extending swingable post connected to said collar and having manual means for swinging said post and thereby moving said collar; and a pivot mounting at the lower end of said swingable post disposed in effective position to permit swinging of said post toward and away from said adhesive transfer roll.

6. In a machine for applying adhesive to chips or the like, the combination of a rotatable adhesive-applying drum for applying the adhesive directly to the chips; an adhesive-transfer roll adapted to rotate against the adhesive-applying drum to transfer adhesive thereto; an adhesive trough disposed beneath the adhesive-transfer roll for constantly supplying the latter with adhesive; a pair of upwardly extending rigid posts spaced apart from each other and being adjacent to the ends of said adhesive-transfer roll; a pair of bearings; substantially horizontal extensions on said bearings movably mounted on said posts, respectively; resilient means on said horizontal extensions biasing the bearings toward said adhesive-applying drum; a pair of axially shiftable elongated pins rotatably supported by said adjustable bearings; a pair of central engagement members on the ends of said adhesive-transfer roll for non-rotatably receiving said pins in order to support said adhesive-transfer roll; a driven member rotatably mounted with respect to one of said pins and having a clutch portion; an axially shiftable clutch member disposed non-rotatably with respect to said one pin and adapted in one position to engage with the clutch portion of said driven member; means for driving said driven member; a pair of manually swingable posts mounted adjacent the ends of said adhesive-transfer roll, one of said swingable posts being connected to said axially shiftable clutch member beyond one end of said adhesive-transfer roll and the other swingable post being connected to the adjacent bearing beyond the other end of said adhesive-transfer roll; a pivot mounting at the lower end of said other swingable post disposed in effective position to limit swinging of the same exclusively toward and away from the axis of said adhesive-applying drum and transversely thereto; and a universal pivot mounting at the lower end of said one swingable post allowing the latter to be swung transversely toward and away from said axis of said adhesive-applying drum and in another direction away from said adhesive-transfer roll to release said clutch member from engagement with said driven member.

7. In a machine for applying adhesive to chips or the like, the combination of a rotatable adhesive-applying drum for applying the adhesive directly to the chips; an adhesive-transfer roll adapted to rotate against the adhesive-applying drum to transfer adhesive thereto; an adhesive trough disposed beneath the adhesive-transfer roll for constantly supplying the latter with adhesive; a pair of spaced, upwardly extending, rigid posts respectively located adjacent to the ends of said adhesive-transfer roll and each being formed with a transverse aperture adjacent the upper end thereof; a pair of bearings; a pair of horizontal shanks individually fixed on the exterior portions of said bearings and extending through the apertures in said fixed posts; stops on the ends of said shanks preventing accidental displacement of the same from said posts; compression springs mounted on the shanks in effective positions to engage against the fixed posts and biasing the bearings toward the axis of said adhesive-applying drum in substantial parallelism thereto; a pair of axially shiftable elongated pins rotatably supported by said adjustable bearings; a pair of central engagement members on the ends of said adhesive-transfer roll for non-rotatably receiving said pins in order to support said adhesive-transfer roll; a driven member rotatably mounted with respect to one of said pins and having a clutch portion; an axially shiftable clutch member disposed non-rotatably with respect to the one pin and adapted in one position to engage with the clutch portion of said driven member; means for driving said driven member; a pair of manually swingable posts respectively located adjacent the ends of said adhesive-transfer roll, one of said swingable posts being connected to said axially shiftable clutch member beyond one end of said adhesive-transfer roll and the other swingable post being connected to the adjacent bearing beyond the other end of said adhesive-transfer roll; a pivot mounting at the lower end of said other swingable post disposed in effective position to limit swinging of the same toward and away from the axis of said adhesive-applying drum and transversely thereto; and a universal pivot mounting at the lower end of said one swingable post allowing the latter to be swung transversely toward and away from said axis of said adhesive-applying drum and in another direction away from said adhesive-transfer roll to release said clutch member from engagement with said driven member.

8. In a machine for applying adhesive to chips or the like, the combination of a rotatable adhesive-applying drum for applying the adhesive directly to the chips; an adhesive-transfer roll adapted to rotate against the adhesive-applying drum to transfer adhesive thereto; an adhesive trough disposed beneath the adhesive-transfer roll for constantly supplying the latter with adhesive; a pair of spaced, upwardly extending rigid posts respectively located adjacent to the ends of said adhesive-transfer roll; a pair of bearings; substantially horizontal extensions on said bearings movably mounted on said posts; resilient means on said horizontal extensions biasing the bearings toward said adhesive-applying drum; a pair of sleeves rotatably supported in said bearings; a pair of axially shiftable elongated pins extending non-rotatably but slidably through said sleeves; means upon said elongated pins for manually shifting them axially at will; a pair of central engaging means upon the ends of said adhesive-transfer roll for non-rotatably receiving said elongated pins in one position thereof in order to support said adhesive-transfer roll; a driven member rotatably mounted on one sleeve beyond one end of said adhesive-transfer roll and having a clutch portion; an axially shiftable clutch member non-rotatably mounted on said one sleeve and in one position thereof engaging with the clutch portion on said driven member; means for driving said driven member and said adhesive-applying drum in the same direction to produce a wiping action between the adhesive-transfer roll and the adhesive applying drum; a pair of upwardly extending and manually swingable bars spaced apart, one bar being operably connected to said clutch member; a universal pivot mounting upon the lower portion of said one bar allowing it to be swung away from said adhesive-transfer roll to release the clutch member from said driven member, the other bar being operably connected to the other sleeve beyond the other end of said adhesive-transfer roll; and a pivot mounting upon the lower end of said other bar allowing it to be manually swung with said one bar toward or away from the axis of said adhesive-applying drum in order to adjust the position of said adhesive-applying roll with respect thereto.

9. In a machine for applying adhesive to clips or the like, the combination of a rotatable adhesive-applying drum for applying the adhesive directly to the chips; an adhesive-transfer roll adapted to rotate against the adhesive-applying drum to transfer adhesive thereto; an adhesive trough disposed beneath the adhesive-transfer roll for constantly supplying the latter with adhesive; a pair of spaced upwardly extending rigid posts respectively located adjacent to the ends of said adhesive-transfer roll; a pair of bearings; substantially horizontal extensions on said bearings movably mounted on said posts; resilient means on said horizontal extensions biasing the bearings toward said adhesive-applying drum; a pair of sleeves rotatably supported in said bearings: a pair of axially shiftable elongated pins extending non-rotatably but slidably through said sleeves; means upon said elongated pins for manually shifting them axially at will; a pair of central engaging means upon the ends of said adhesive-transfer roll for non-rotatably receiving said elongated pins in one position thereof in order to support said adhesive-transfer roll; a driven member rotatably mounted on one sleeve beyond one end of said adhesive-transfer roll and having a clutch portion; an axially shiftable clutch member non-rotatably mounted on said one sleeve and in one position thereof engaging with the clutch portion on said driven member; a spring mounted on said one sleeve between the bearing thereof and said respectively adjacent end of the adhesive-transfer roll; means for driving said driven member; a pair of upwardly extending and manually swingable bars having handles on the upper ends thereof, one bar being operably connected intermediate the ends thereof to said clutch member; a universal pivot mounting upon the lower portion of said one bar allowing it to be swung away from said adhesive-transfer drum to release said clutch member from said driven member, and the other bar being operably connected intermediate the ends thereof to the other sleeve beyond the other end of said adhesive-transfer roll; and a pivot mounting upon the lower end of said other bar allowing it to be manually swung with said one bar toward or away from the axis of said adhesive-applying drum in order to adjust the position of said adhesive-applying roll with respect thereto.

10. In a machine for applying adhesive to chips or the like, the combination of a rotatable adhesive-applying drum for applying the adhesive directly to the chips; an adhesive-transfer roll adapted to rotate against the adhesive-applying drum to transfer adhesive thereto; an adhesive trough disposed beneath the adhesive-transfer roll for constantly supplying the latter with adhesive; a pair of spaced upwardly extending rigid posts respectively located adjacent to the ends of said adhesive-transfer roll; a pair of bearings; substantially horizontal extensions on said bearings individually movably supported on said posts; springs mounted on the horizontal extensions biasing the bearings toward said adhesive-applying drum; central sockets upon the ends of the adhesive-transfer roll; a pair of sleeves mounted in said bearings; a pair of axially shiftable non-rotatable pins extending through the sleeves and adapted to project non-rotatably into the end sockets of said adhesive-transfer roll; manual means upon the outer mutually remote ends of said shiftable pins for manipulating them; a driven member rotatably mounted with respect to one of said pins and having a clutch portion; an axially shiftable clutch member disposed non-rotatably with respect to the one pin and adapted to one position to engage with the clutch portion of said driven member; means for driving said driven member; a pair of upwardly extending and manually swingable bars spaced apart, one bar being operably connected to said clutch member; a universal pivot mounting upon the lower portion of said one bar allowing it to be swung away from said adhesive-transfer roll to release the clutch member from said driven member, the other bar being operably connected to the other sleeve beyond the other end of said adhesive-transfer roll; upwardly projecting rigid extensions on said swingable bars; manual means upon the upper ends of said rigid extensions whereby to manipulate said swingable bars; and a pivot mounting upon the lower end of said other bar allowing it to be manually swung with said one bar exclusively toward or away from the axis of said adhesive-applying drum in order to adjust the position of said adhesive-transfer roll with respect thereto.

References Cited in the file of this patent

UNITED STATES PATENTS

| Number | Name | Date |
|---|---|---|
| 1,223,516 | Peters et al. | Apr. 24, 1917 |
| 2,236,239 | Lipton | Mar. 25, 1941 |
| 2,424,323 | Millholland | July 22, 1947 |
| 2,542,804 | Fahrni | Feb. 20, 1951 |